(12) United States Patent
Meng et al.

(10) Patent No.: US 11,697,738 B2
(45) Date of Patent: Jul. 11, 2023

(54) COMPOSITION, ITS PREPARATION METHOD, AND THE USE OF THE COMPOSITION IN CONSTRUCTION APPLICATION

(71) Applicant: BASF SE, Ludwigshafen am Rhein (DE)

(72) Inventors: Lei Meng, Shanghai (CN); Sheng Zhong Zhou, Shanghai (CN); Harald Roeckel, Muenster (DE)

(73) Assignee: BASF SE, Ludwigshafen am Rhein (DE)

( * ) Notice: Subject to any disclaimer, the term of this patent is extended or adjusted under 35 U.S.C. 154(b) by 251 days.

(21) Appl. No.: 16/958,681

(22) PCT Filed: Dec. 19, 2018

(86) PCT No.: PCT/EP2018/085824
§ 371 (c)(1),
(2) Date: Jun. 27, 2020

(87) PCT Pub. No.: WO2019/129572
PCT Pub. Date: Jul. 4, 2019

(65) Prior Publication Data
US 2020/0385585 A1 Dec. 10, 2020

(30) Foreign Application Priority Data

Dec. 27, 2017 (WO) ............... PCT/CN2017/119092

(51) Int. Cl.
| | | |
|---|---|---|
| *C09D 4/00* | (2006.01) | |
| *C04B 41/00* | (2006.01) | |
| *C04B 41/48* | (2006.01) | |
| *C04B 41/63* | (2006.01) | |
| *C09D 4/06* | (2006.01) | |
| *C09D 5/00* | (2006.01) | |

(52) U.S. Cl.
CPC .............. *C09D 4/00* (2013.01); *C04B 41/009* (2013.01); *C04B 41/4857* (2013.01); *C04B 41/63* (2013.01); *C09D 4/06* (2013.01); *C09D 5/002* (2013.01)

(58) Field of Classification Search
CPC .. C09D 4/00; C09D 4/06; C09D 5/002; C04B 41/009; C04B 41/4857; C04B 41/63
USPC ......................................................... 525/244
See application file for complete search history.

(56) References Cited

U.S. PATENT DOCUMENTS

2014/0329980 A1  11/2014  Malofsky et al.
2017/0349702 A1*  12/2017  Palsule .................. C08G 63/52

FOREIGN PATENT DOCUMENTS

| WO | 2013/149173 A1 | 10/2013 | |
| WO | 2017/210415 A1 | 12/2017 | |
| WO | WO-2017210415 A1 * | 12/2017 | ............. C08G 63/00 |

OTHER PUBLICATIONS

International Preliminary Report on Patentability received for PCT Patent Application No. PCT/EP2018/085824, dated Jul. 9, 2020, 8 pages.
International Search Report and Written Opinion received for PCT Patent Application No. PCT/EP2018/085824, dated Mar. 25, 2019, 10 pages.

* cited by examiner

*Primary Examiner* — Michael M. Bernshteyn
(74) *Attorney, Agent, or Firm* — Faegre Drinker Biddle & Reath LLP

(57) ABSTRACT

The present invention relates to a curable resin composition. More specifically, the present invention relates to a composition comprising methylene malonate functional reactive resin, to its preparation methods, and to the use of the composition in the construction field.

15 Claims, No Drawings

COMPOSITION, ITS PREPARATION METHOD, AND THE USE OF THE COMPOSITION IN CONSTRUCTION APPLICATION

CROSS-REFERENCE TO RELATED APPLICATIONS

This application is a national stage application (under 35 U.S.C. § 371) of PCT/EP2018/085824, filed Dec. 19, 2018, which claims benefit of Chinese Application No. PCT/CN2017/119092, filed Dec. 27, 2017, both of which are incorporated herein by reference in their entirety.

TECHNICAL FIELD

The present invention relates to a curable resin composition. More specifically, the present invention relates to a composition comprising methylene malonate functional reactive resin, to its preparation methods, and to the use of the composition in the construction field.

BACKGROUND

Construction coatings are widely used in applications including but not limited to flooring in industrial and commercial buildings, anchoring in tunnels and mines, consolidating rocks, slags and coals in tunnels and mines, and waterproofing in roof, basement, balconies, bridge, dams, river locks, dykes, marine cargo ports, docks, parking lots, pools, sewage, tunnels, mines as well as subway and railway tracks.

Substrates for construction coating such as concrete or stone, normally have porous surfaces where the tiny holes preserve air and enable a permeability of moisture, certain chemicals and coats. Therefore, a primer is required before applying the next layer of coats and it is even more significant for thick coats like self-leveling. The primer is a thin layer of coating that well adheres to the porous surfaces and further penetrates the substrates to seal the surfaces of the substrates. The tiny holes are filled by the primer and the preserved air is released into the atmosphere. Thus, defects like bubbles or holes are avoided in coats and moreover, the primer forms a barrier between the substrates and moisture, certain chemicals as well as the coats. In one hand, the substrates are protected by the primer since the moisture and certain chemicals cause deterioration. And in the other hand, the substrates hardly absorb the coats and hence no waste occurs.

Current primers are mainly based on epoxy, urethane, polyester and acrylate resins. A big disadvantage of epoxy-based and urethane-based primers is their long curing time, especially at low temperature or under high humidity. And acrylate-based primers have a problem of strong odor. Another disadvantage of current primers is the solvent used like xylene-based or toluene-based chemicals are harmful for health. And a further disadvantage of current primers is they are normally two-package products and a strict proportioning is required to obtain the mixture for applying the coats, which brings more complexity to the constructors. Therefore, it is still required to provide a primer used in various construction applications that is free of solvent, simple for handling, fast curing in a wide range of temperature and humidity, and, at the same time, has expected performances including good mechanical and chemical properties.

SUMMARY OF THE INVENTION

An object of this invention is to provide a composition which does not have the above deficiencies in the prior art. Particularly, an object of this invention is to provide a novel composition, wherein the methylene malonate monomer and the polymer thereof are mixed in a certain ratio. Such composition can be anionic polymerized with intrinsically basic substrates, e.g. concrete and basic stone surface, and is excellent in curability and forms a cured product excellent in adhesion, acid/alkaline resistance, solvent resistance and the like. The resulting cured product is substantially a 100% solid compound with little volatile organic compounds (VOC). The curable resin composition of the present invention can be effectively used as coating in the construction applications, for example, for flooring, waterproofing, wall paint and underground construction applications.

Surprisingly, it has been found by the inventor that the above objection can be solved by a composition comprising, (A) at least one methylene malonate monomer having formula (I)

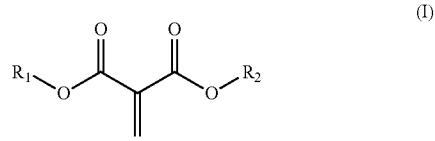

wherein, $R_1$ and $R_2$ are in each case independently selected from the group consisting of C1-C30-alkyl, C2-C30-alkenyl, C3-C30-cycloalkyl, C2-C30-heterocyclyl, C2-C30-heterocyclyl-C1-C30-alkyl, C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cycloalkyl, each of which radicals is optionally substituted, the heteroatom being selected from N, O and S;

(B) at least one methylene malonate polymer having formula (II):

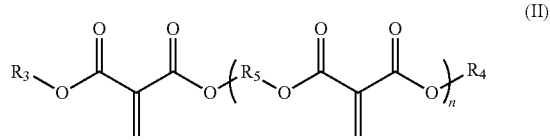

wherein, $R_3$ and $R_4$ are in each case independently selected from the group consisting of C1-C30-alkyl, C2-C30-alkenyl, C3-C30-cycloalkyl, C2-C30-heterocyclyl, C2-C30-heterocyclyl-C1-C30-alkyl, C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cycloalkyl, each of which radicals is optionally substituted, the heteroatom being selected from N, O and S;

n is an integer from 1 to 20;

$R_5$, if n=1 is, or if n>1 are in each case independently, selected from the group consisting of C1-C30-alkylene, C2-C30-alkenylene, C2-C30-alkynylene, C6-C30-arylene, C3-C30-cycloalkylene, C3-C30-cycloalkenylene, C3-C30-cycloalkynylene, C2-C30-heterocyclylene, and C2-C30-heteroarylene, each of which radicals is optionally substituted, the heteroatom being selected from N, O and S, wherein $R_5$ is optionally interrupted by a radical selected from N, O and S; and (C) at least one acidic stabilizer;

wherein, the monomer (A) is in an amount of 1 to 75 wt. %, preferably 5 to 60 wt. %, more preferably 10 to 55 wt. %, and most preferably 10 to 30 wt. %;

the acidic stabilizer (C) is in an amount of from 0.1 to 1000 ppm, preferably from 0.1 to 500 ppm and more preferably from 0.1 to 200 ppm, in each case based on the total weight of the monomer (A) and the polymer (B).

The composition is prepared by a process comprising steps of:

mixing the monomer (A), the polymer (B) and the acidic stabilizer (C).

It has been surprisingly found that the composition according to present invention can be formulated without extra catalysts/initiators to be applied on concrete surface or stone surface, which can undergo fast curing. The cured products seal porous surface very well and their adhesion onto the surface is very good. They also show excellent mechanical performance and are resistant to solvents, acid, alkaline conditions.

In still another aspect, the invention relates to the use of the composition according to the invention as a coating material.

DETAILED DESCRIPTION OF THE INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the term "about" is understood to refer to a range of numbers that a person of skill in the art would consider equivalent to the recited value in the context of achieving the same function or result.

As used herein, the term "methylene malonate" refers to a compound having the core formula —O—C(O)—C (=$CH_2$)—C(O)—O—.

As used herein, the term "two-component" refers to a composition comprising two components, each of which may also be a mixture of several compounds. The two components can be blended together if needed. And the two components may also be two independent packages that can be mixed on the spot for applications.

As used herein, the term "RH" is equal to "Relative Humidity" and refers to the ratio of the partial vapor pressure of water to the saturated vapor pressure of water at a given temperature.

As used herein, the term "substantial absence" as in "substantial absence of the solvent" refers to a reaction mixture which comprises less than 1% by weight of the particular component as compared to the total reaction mixture. In certain embodiments, the "substantial absence" refers to less than 0.7%, less than 0.5%, less than 0.4%, less than 0.3%, less than 0.2% or less than 0.1% by weight of the particular component as compared to the total reaction mixture. In certain other embodiments, the "substantial absence" refers to less than 1.0%, less than 0.7%, less than 0.5%, less than 0.4%, less than 0.3%, less than 0.2% or less than 0.1% by volume of the particular component as compared to the total reaction mixture.

As used herein, the term "stabilized," e.g., in the context of "stabilized" monomers of the invention or compositions comprising the same, refers to the tendency of the monomers of the invention (or their compositions) to substantially not polymerize with time, to substantially not harden, form a gel, thicken, or otherwise increase in viscosity with time, and/or to substantially show minimal loss in cure speed (i.e., cure speed is maintained) with time as compared to similar compositions that are not stabilized.

As used herein, the term "shelf-life," e.g., as in the context of the compositions of the invention having an improved "shelf-life," refers to the compositions of the invention which are stabilized for a given period of time, e.g., 1 month, 6 months, or even 1 year or more.

As used herein, the term "additives" refers to additives included in a formulated system to enhance physical or chemical properties thereof and to provide a desired result. Such additives include, but are not limited to, dyes, pigments, toughening agents, impact modifiers, rheology modifiers, plasticizing agents, thixotropic agents, natural or synthetic rubbers, filler agents, reinforcing agents, thickening agents, opaciffers, inhibitors, fluorescence or other markers, thermal degradation reducers, thermal resistance conferring agents, surfactants, wetting agents, defoaming agents, dispersants, flow or slip aids, biocides, and stabilizers.

As used herein, the term "base" refers to a component having at least one electronegative group capable of initiating anionic polymerization.

As used herein the term "base precursor" refers to a component that may be converted to a base upon being acted upon in some manner, e.g., application of heat, chemical reaction, or UV activation.

As used herein, the term "base enhancer" refers to an agent that is capable of acting in some manner to improve or enhance the basicity of an agent.

As used herein, the term "halogen atom", "halogen", "halo-" or "Hal-" is to be understood as meaning a fluorine, chlorine, bromine or iodine atom.

As used herein, the term "alkyl", either on its own or else in combination with further terms, for example haloalkyl, is understood as meaning a radical of a saturated aliphatic hydrocarbon group and may be branched or unbranched, for example methyl, ethyl, propyl, butyl, isobutyl, pentyl, hexyl, heptyl, octyl, nonyl, decyl, undecyl or dodecyl, or an isomer thereof.

As used herein, the term "alkenyl", either on its own or else in combination with further terms, for example haloalkenyl, is understood as meaning a straight-chain or branched radical which has at least one double bond, for example vinyl, allyl, propenyl, butenyl, butadienyl, pentenyl, pentadienyl, hexenyl, or hexadienyl, or an isomer thereof.

As used herein, the term "alkynyl", either on its own or else in combination with further terms, for example haloalkynyl, is understood as meaning a straight-chain or branched radical which has at least one triple bond, for example ethynyl, propynyl, or propargyl, or an isomer thereof.

As used herein, the term "cycloalkyl", either on its own or else in combination with further terms, is understood as meaning a fused or non-fused, saturated, monocyclic or polycyclic hydrocarbon ring, for example cyclopropyl, cyclobutyl, cyclopentyl, cyclohexyl, cycloheptyl, or cyclooctyl, or an isomer thereof.

As used herein, the term "alkoxy", either on its own or else in combination with further terms, for example haloalkoxy, is understood as meaning linear or branched, saturated, group having a formula —O-alkyl, in which the term "alkyl" is as defined above, for example methoxy, ethoxy, propoxy, butoxy, pentoxy, or hexoxy, or an isomer thereof.

As used herein, the term "aryl", either on its own or else in combination with further terms, for example arylalkyl, is understood to include fused or non-fused aryl, such as phenyl or naphthyl, wherein phenyl is optionally substituted by 1 to 5 groups, and naphtyl is optionally substituted by 1 to 7 groups.

As used herein, the term "hetero-" is understood as meaning a saturated or unsaturated radical which is interrupted by at least one heteroatom selected from the group consisting of oxygen (O), nitrogen (N), and sulphur (S).

As used herein, the term "A- to B-hetero-", for example "3- to 6-hetero-", is understood as meaning a fused or non-fused, saturated or unsaturated monocyclic or polycyclic radical comprising, in addition to carbon atom, at least one heteroatom selected from the group consisting of oxygen (O), nitrogen (N), and sulphur (S), provided that the sum of the number of carbon atom and the number of heteroatom is within the range of A to B. The hetero groups according to this invention are preferably 5- to 30-hetero groups, most preferably 6- to 18-hetero groups, especially 6- to 12-hetero groups, and particularly 6- to 8-hetero groups.

As used herein, the term "heterocyclyl" is understood as including aliphatic or aromatic heterocyclyl, for example heterocyclylalkyl or heterocyclylalkenyl.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

The term "optionally substituted" means optional substitution with the specified groups, radicals or moieties. Unless stated otherwise, optionally substituted radicals may be mono- or polysubstituted, where the substituents in the case of polysubstitution may be the same or different.

As used herein, halogen-substituted radicals, for example haloalkyl, are mono- or polyhalogenated, up to the maximum number of possible substituents. In the case of polyhalogenation, the halogen atoms can be identical or different. In this case, halogen is fluorine, chlorine, bromine or iodine.

As used herein, the groups with suffix "-ene" represent the groups have two covalent bond which could be linked to other radicals, for example —CH$_2$CH(CH$_3$)CH$_2$— (isobutylene),

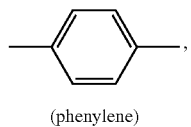

(phenylene)

and in the case of phenylene, the covalent bond may be located in ortho-, meta-, or para-position.

Unless otherwise identified, all percentages (%) are "percent by weight".

The radical definitions or elucidations given above in general terms or within areas of preference apply to the end products and correspondingly to the starting materials and intermediates. These radical definitions can be combined with one another as desired, i.e. including combinations between the general definition and/or the respective ranges of preference and/or the embodiments.

Unless otherwise identified, the temperature refers to room temperature and the pressure refers to ambient pressure.

Unless otherwise identified, the solvent refers to all organic and inorganic solvents known to the persons skilled in the art and does not include any type of monomer molecular.

In one aspect, the invention provides a composition comprising,
(A) at least one methylene malonate monomer having formula (I)

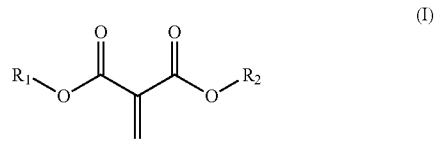

wherein, $R_1$ and $R_2$ are in each case independently selected from the group consisting of C1-C30-alkyl, C2-C30-alkenyl, C3-C30-cyclolalkyl, C2-C30-heterocyclyl, C2-C30-heterocyclyl-(C1-C30-alkyl), C6-C30-aryl, C6-C30-aryl-C1-C30-alkyl, C2-C30-heteroaryl, C2-C30-heteroaryl-C1-C30-alkyl, and C1-C30-alkoxy-C1-C30-alkyl, halo-C1-C30-alkyl, and halo-C3-C30-cyclolalkyl, each of which radicals is optionally substituted, the heteroatom being selected from N, O and S;
(B) at least one methylene malonate polymer having formula (II)

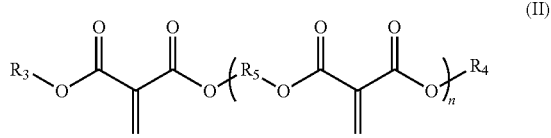

wherein, $R_3$ and $R_4$ are, in each case independently selected from the group consisting of C1-C30-alkyl, C2-C30-alkenyl, C3-C30-cyclolalkyl, C2-C30-heterocyclyl, C2-C30-heterocyclyl-C1-C30-alkyl, C6-C30-aryl, C6-C30-aryl-(C1-C30-alkyl), C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S; n is an integer from 1 to 20;
$R_5$, if n=1, is or if n>1, are in each case independently selected from the group consisting of C1-C30-alkylene, C2-C30-alkenylene, C2-C30-alkynylene, C6-C30-arylene, C3-C30-cyclolalkylene, C3-C30-cyclolalkenylene, C3-C30-cyclolalkynylene, C2-C30-heterocyclylene, and C2-C30-heteroarylene, each of which radicals is optionally substituted, the heteroatom being selected from N, O and S, wherein $R_5$ is optionally interrupted by a radical selected from N, O and S; and
(C) at least one acidic stabilizer;
wherein, the monomer (A) is in an amount of 1 to 75 wt. %, preferably 5 to 60 wt. %, more preferably 10 to 55 wt. %, and most preferably 10 to 30 wt. %, and the acidic stabilizer (C) is in an amount of from 0.1 to 1000 ppm, preferably from 0.1 to 500 ppm and more preferably from 0.1 to 200 ppm, in each case based on the total weight of the monomer (A) and the polymer (B).

In a preferred embodiment of the invention, $R_1$ and $R_2$ are in each case independently selected from the group consisting of C1-C10-alkyl, C2-C10-alkenyl, C3-C10-cyclolalkyl, C2-C10-hetercyclyl, C2-C10-hetercyclyl-C1-C10-alkyl, C3-C18-aryl, C3-C18-aryl-C1-C10-alkyl, C2-C10-heteroaryl, C2-C10-heteroaryl-C1-C10-alkyl, and C1-C10-alkoxy-C1-C10-alkyl, halo-C1-C10-alkyl, and halo-C3-C10-cyclolalkyl; each of which radicals is optionally substituted, the heteroatom being selected from N, O and S.

Preferably, $R_1$ and $R_2$ are in each case independently selected from the group consisting of C1-C6-alkyl, C2-C6-alkenyl, C3-C6-cyclolalkyl, C3-C6-hetercyclyl, C3-C6-hetercyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl; each of which radicals is optionally substituted, the heteroatom being selected from N, O and S;

More preferably, $R_1$ and $R_2$ are in each case independently selected from the group consisting of C1-C6-alkyl, for example methyl, ethyl, n- or isopropyl, n-, iso-, tert- or 2-butyl, pentyls such as n-pentyl and isopentyl, hexyls such as n-hexyl, isohexyl and 1,3-dimethylbutyl;

According to still further preferred embodiment of the invention, wherein $R_1$ and $R_2$ are in each case independently selected from the group consisting of C1-C6-alkyl, for example methyl, ethyl, n-propyl, n-butyl, n-pentyl, n-hexyl.

In a preferred embodiment of the invention, $R_3$ and $R_4$ are in each case independently selected from the group consisting of C1-C10-alkyl, C2-C10-alkenyl, C3-C10-cyclolalkyl, C2-C10-hetercyclyl, C2-C10-hetercyclyl-C1-C10-alkyl, C3-C18-aryl, C3-C18-aryl-C1-C10-alkyl, C2-C10-heteroaryl, C2-C10-heteroaryl-C1-C10-alkyl, and C1-C10-alkoxy-C1-C10-alkyl, halo-C1-C10-alkyl, and halo-C3-C10-cyclolalkyl; each of which radicals are optionally substituted, the heteroatom being selected from N, O and S.

Preferably, $R_3$ and $R_4$ are in each case independently selected from the group consisting of C1-C6-alkyl, C2-C6-alkenyl, C3-C6-cyclolalkyl, C3-C6-hetercyclyl, C3-C6-hetercyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl; each of which radicals is optionally substituted, the heteroatom being selected from N, O and S.

More preferably, $R_3$ and $R_4$ are in each case independently selected from the group consisting of C1-C6-alkyl, for example methyl, ethyl, n- or isopropyl, n-, iso-, tert- or 2-butyl, pentyls such as n-pentyl and isopentyl, hexyls such as n-hexyl, isohexyl and 1,3-dimethylbutyl.

According to still further preferred embodiment of the invention, wherein $R_3$ and $R_4$ are in each case independently selected from the group consisting of C1-C6-alkyl, for example methyl, ethyl, n-propyl, n-butyl, n-pentyl, n-hexyl.

In a preferred embodiment of the invention, $R_1$, $R_2$, $R_3$ and $R_4$ are the same.

Preferably, n is an integer from 1 to 15, more preferably from 1 to 10, much more preferably from 1 to 8, most preferably from 2 to 8 and especially from 3 to 6.

In a preferred embodiment, $R_5$, if n=1 is, or if n>1 are in each case independently, selected from the group consisting of C1-C10-alkylene, C2-C10-alkenylene, C2-C10-alkynylene, C3-C18-arylene, C3-C10-cyclolalkylene, C3-C10-cyclolalkenylene, C3-C10-cyclolalkynylene, C2-C10-hetercyclylene, and C2-C10-heteroarylene, each of which radicals is optionally substituted, the heteroatom being selected from N, O and S, wherein $R_5$ is optionally interrupted by a radical selected from N, O and S; and Preferably, $R_5$, if n=1 is, or if n>1 are in each case independently, selected from the group consisting of C1-C6-alkylene, C2-C6-alkenylene, C2-C6-alkynylene, C6-C8-arylene, C3-C6-cyclolalkylene, C3-C6-cyclolalkenylene, C3-C10-cyclolalkynylene, C3-C6-hetercyclylene, and C3-C6-heteroarylene; each of which radicals is optionally substituted, the heteroatom being selected from N, O and S, wherein $R_5$ is optionally interrupted by a radical selected from N, O and S.

More preferably, $R_5$, if n=1 is, or if n>1 are in each case independently, selected from the group consisting of C1-C6-alkylene and C6-C8-arylene; each of which radicals is optionally substituted by at least one C1-C6-alkyl.

Most preferably, $R_5$, if n=1 is, or if n>1 are in each case independently, selected from the group consisting of propylidene, pentylidene and phenylene; each of the radicals is optionally substituted by methyl.

In a preferred embodiment of the invention, the radicals are further substituted by substituents. Possible substituents are selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-hetercyclyl, C2-C10-hetercyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, the heteroatom being selected from N, O and S.

Preferably, the substituents are selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-hetercyclyl, C3-C6-hetercyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S.

In each case, the compositions of the invention shall include one or more compounds to extend the shelf-life. In certain embodiments, the compositions are formulated such that the composition is stable for at least 6 months and preferably, is stable for at least one year. Said compounds comprise acidic stabilizer.

The acidic stabilizer is preferably one or more selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid. Such acidic stabilizers have a pKa value in the range of, for example, between about −15 to about 5, or between about −15 to about 3, or between about −15 to about 1, or between about −2 to about 2, or between about 2 to about 5, or between about 3 to about 5.

The acidic stabilizer is in an amount of from 0.1 to 500 ppm, preferably from 0.1 to 300 ppm and more preferably from 0.1 to 200 ppm, based on the total weight of the component (A) and component (B).

According to an embodiment of the invention, the composition is substantial absence of any solvent.

According to an embodiment of the invention, the composition further comprises additives. In certain embodiments of the invention, the additive is at least one selected from plasticizers, thixotropic agents, adhesion promoters, antioxidants, light stabilizers, UV stabilizer, filler, cement, lime stone, surfactant, wetting agents, viscosity modifier, extenders, dispersants, anti-blocking agents, air release agents, anti-sagging agents, anti-setting agents, matting agents, flattening agents, waxes, anti-mar additives, anti-scratch additives, defoaming agent coloring agent, fiber, polymer powder, mesh, chip, hollow spheres and inert resins. In a preferred embodiment of the invention, the additives is at least one selected from plasticizers, thixotropic agents, adhesion promoters, antioxidants, light stabilizers, UV stabilizer, filler, surfactant, wetting agents, viscosity modifier, dispersants, air release agents, anti-sagging agents, anti-setting agents, defoaming agent, coloring agent, fiber, polymer powder, mesh, chip, hollow spheres and inert resins.

In a preferred embodiment, the additive is at least selected from plasticizers, thixotropic agents, adhesion promoters, antioxidants, light stabilizers, UV stabilizer, filler, cement, lime stone, surfactant, wetting agents, viscosity modifier, dispersants, air release agents, anti-sagging agents, anti-setting agents, defoaming agent, coloring agent, fiber, polymer powder, mesh, chip, hollow spheres and inert resins For those skilled in the art, the above additives are commercially available. The above formulation additives, if any, are presented in an amount commonly used in the art.

The composition according to the invention is obtained by a process comprising steps of mixing the monomer (A), the polymer (B) and the acidic stabilizer (C). The mixing used in the method is carried out by conventional means in the art in a unit suitable for mixing, for example, by stirring or agitating at a room temperature.

In a preferred embodiment, the process for preparing the composition according to the invention comprises a) mixing the monomer (A) and the polymer (B) in amounts as described in the above; b) adding the acidic stabilizer (C) into the mixture obtained from step (a).

According to specifically aspects of the invention, the monomer (A) having formula (I) could be prepared by those skilled in the art by means of the following steps: (a) reacting a malonic acid ester with a source of formaldehyde, optionally in the presence of an acidic or basic alkali accelerator, and optionally in the presence of an acidic or non-acidic solvent, to form a reaction complex; (b) contacting the reaction complex or a portion thereof with an energy transfer means to produce a vapor phase comprising methylene malonates monomer; and (c) isolating the methylene malonates monomer from the vapor phase.

According to an embodiment of the invention, the polymer (B) having formula (II) could be prepared by those skilled in the art by means of the following steps: An appropriate amount of starting material (e.g., DEMM) and an appropriate amount of OH-containing linking group (e.g., diol) are mixed and reacted in the presence of a catalyst (e.g., Novazym 435), and the resulting mixture is stirred and heated for a period of time at a certain temperature, while the alcohol generated was removed by evaporation. Subsequently, the reaction mixture is cooled and stabilized with a minor amount of acid stabilizer, and then filtered to obtain the crude residue, which is further purified on column chromatography to obtain the desired product.

In still another aspect, the invention relates to the use of the composition according to the invention as a coating for flooring, waterproofing, wall paint and underground construction applications applied on alkali substrates.

The application of the invention is performed in a conventional way in the art. In a preferred embodiment, a mixture comprising monomer (A) and polymer (B), mixed with the acidic stabilizer (C) and additives such as filler and UV stabilizer, applied on the substrate and, after a while, to obtain a substantially 100% solid product.

In the present invention, coating is carried out in a way known to those skilled in the art, for example by brushing, spraying, or roll coating. It is noted that the way of coating used in the present invention depends on the workability of the composition, particularly, long gel time is needed for roller coating, whereas short gel time is needed for spray coating.

In the embodiments of the present invention, the alkali substrates comprise concrete, alkali stone, alkali mineral powder, metals. Examples of alkali stone include limestone, andesite, basalt etc.

In the embodiments of the present invention, composition or the mixture is applied on wet substrates.

In the embodiments of the present invention, the temperature for the use is from −30° C. to 60° C., preferably from −20° C. to 40° C.

In the embodiments of the present invention, the relative humidity for the use is from 1% to 99%, preferably from 5% to 95%.

EMBODIMENT

The following embodiments are used to illustrate the invention in more detail.

The 1$^{st}$ embodiment is a composition comprising
(A) at least one methylene malonate monomer having formula (I):

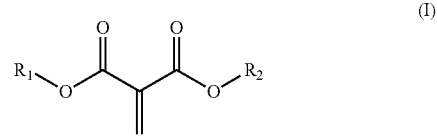

wherein, $R_1$ and $R_2$ are in each case independently selected from the group consisting of C1-C30-alkyl, C2-C30-alkenyl and C3-C30-cycloalkyl;

(B) at least one methylene malonate polymer having formula (II):

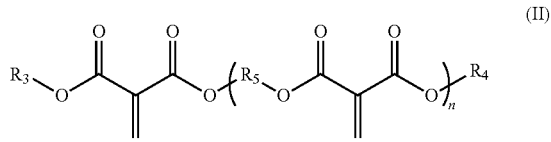

wherein, $R_3$ and $R_4$ are in each case independently selected from the group consisting of C1-C30-alkyl, C2-C30-alkenyl and C3-C30-cycloalkyl;

n is integer from 2 to 8; and $R_5$, if n=1 is, or if n>1 are in each case independently, selected from the group consisting of C1-C30-alkylene and C6-C30-arylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein the monomer (A) is in an amount of 10 to 60 wt. %, and the acidic stabilizer (C) is in an amount of 0.1 to 150 ppm, in each case based on the total weight of the monomer (A) and the polymer (B).

The 2nd embodiment is a composition comprising
(A) at least one methylene malonate monomer having formula (I):

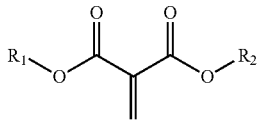
(I)

wherein, $R_1$ and $R_2$ are in each case independently selected from the group consisting of C1-C30-alkyl, C2-C30-alkenyl and C3-C30-cyclolalkyl;
(B) at least one methylene malonate polymer having formula (II):

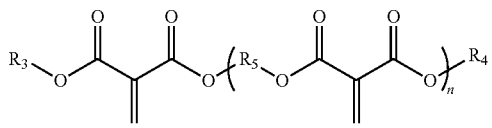
(II)

wherein, $R_3$ and $R_4$ are in each case independently selected from the group consisting of C1-C30-alkyl, C2-C30-alkenyl and C3-C30-cyclolalkyl;
n is integer from 2 to 8; and
$R_5$, if n=1 is, or if n>1 are in each case independently, selected from the group consisting of C1-C30-alkylene and C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 60 wt. %, and the acidic stabilizer (C) is in an amount of 0.1 to 120 ppm, in each case based on the total weight of the monomer (A) and the polymer (B).

The 3rd embodiment is a composition comprising
(A) at least one methylene malonate monomer having formula (I):

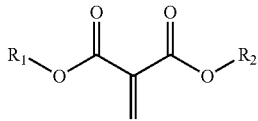
(I)

wherein, $R_1$ and $R_2$ are in each case independently selected from the group consisting of C1-C30-alkyl, C2-C30-alkenyl and C3-C30-cyclolalkyl;
(B) at least one methylene malonate polymer having formula (II):

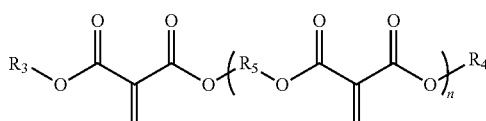
(II)

wherein, $R_3$ and $R_4$ are in each case independently selected from the group consisting of C1-C30-alkyl, C2-C30-alkenyl and C3-C30-cyclolalkyl;
n is integer from 2 to 8; and
$R_5$, if n=1 is, or if n>1 are in each case independently, selected from the group consisting of C1-C30-alkylene and C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 55 wt. %, and the acidic stabilizer (C) is in an amount of 0.1 to 120 ppm, in each case based on the total weight of the monomer (A) and the polymer (B).

The 4th embodiment is a composition comprising
(A) at least one methylene malonate monomer having formula (I):

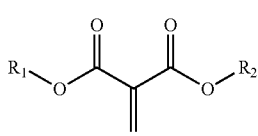
(I)

wherein, $R_1$ and $R_2$ are in each case independently selected from the group consisting of C1-C30-alkyl, C2-C30-alkenyl and C3-C30-cyclolalkyl;
(B) at least one methylene malonate polymer having formula (II):

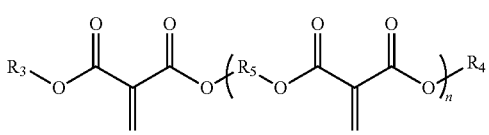
(II)

wherein, $R_3$ and $R_4$ are in each case independently selected from the group consisting of C1-C30-alkyl, C2-C30-alkenyl and C3-C30-cyclolalkyl;
n is integer from 2 to 8; and
$R_5$, if n=1 is, or if n>1 are in each case independently, selected from the group consisting of C1-C30-alkylene and C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 55 wt. %, and the acidic stabilizer (C) is in an amount of 0.1 to 120 ppm, in each case based on the total weight of the monomer (A) and the polymer (B).

The 5th embodiment is a composition comprising
(A) at least one methylene malonate monomer having formula (I):

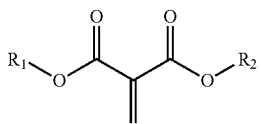

wherein, $R_1$ and $R_2$ are in each case independently selected from the group consisting of C1-C30-alkyl, C2-C30-alkenyl and C3-C30-cyclolalkyl;

(B) at least one methylene malonate polymer having formula (II):

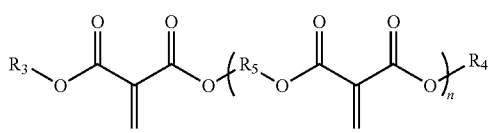

wherein, $R_3$ and $R_4$ are in each case independently selected from the group consisting of C1-C30-alkyl, C2-C30-alkenyl and C3-C30-cyclolalkyl;

n is integer from 2 to 8; and $R_5$, if n=1 is, or if n>1 are in each case independently, selected from the group consisting of C1-C30-alkylene, C2-C30-alkenylene, C2-C30-alkynylene, C6-C30-arylene, C3-C30-cycloalkylene, C3-C30-cycloalkenylene, C3-C30-cycloalkynylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein, the monomer (A) is in an amount of 10 to 55 wt. %, and the acidic stabilizer (C) is in an amount of 0.1 to 120 ppm, in each case based on the total weight of the monomer (A) and the polymer (B).

The 6th embodiment is a composition comprising (A) at least one methylene malonate monomer having formula (I):

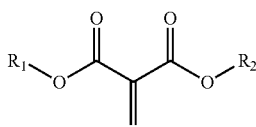

wherein, $R_1$ and $R_2$ are in each case independently selected from the group consisting of C1-C30-alkyl, C2-C30-alkenyl and C3-C30-cyclolalkyl;

(B) at least one methylene malonate polymer having formula (II):

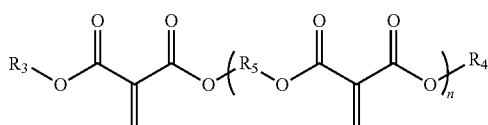

wherein, $R_3$ and $R_4$ are in each case independently selected from the group consisting of C1-C30-alkyl, C2-C30-alkenyl and C3-C30-cyclolalkyl;

n is integer from 3 to 6; and $R_5$, if n=1 is, or if n>1 are in each case independently, selected from the group consisting of C1-C30-alkylene, C2-C30-alkenylene, C2-C30-alkynylene, C6-C30-arylene, C3-C30-cycloalkylene, C3-C30-cycloalkenylene, C3-C30-cycloalkynylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein, the monomer (A) is in an amount of 10 to 55 wt. %, and the acidic stabilizer (C) is in an amount of 0.1 to 120 ppm, in each case based on the total weight of the monomer (A) and the polymer (B).

The 7th embodiment is a composition comprising (A) at least one methylene malonate monomer having formula (I):

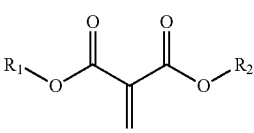

wherein, $R_1$ and $R_2$ are in each case independently selected from the group consisting of C1-C30-alkyl, C2-C30-alkenyl and C3-C30-cyclolalkyl;

(B) at least one methylene malonate polymer having formula (II):

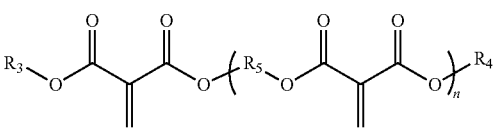

wherein, $R_3$ and $R_4$ are in each case independently selected from the group consisting of C1-C30-alkyl, C2-C30-alkenyl and C3-C30-cyclolalkyl;

n is integer from 3 to 6; and $R_5$, if n=1 is, or if n>1 are in each case independently, selected from the group consisting of C1-C30-alkylene and C6-C30-arylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein, the monomer (A) is in an amount of 10 to 55 wt. %, and the acidic stabilizer (C) is in an amount of 0.1 to 120 ppm, in each case based on the total weight of the monomer (A) and the polymer (B).

The 8th embodiment is a composition comprising (A) at least one methylene malonate monomer having formula (I):

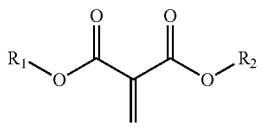

wherein, $R_1$ and $R_2$ are in each case independently selected from the group of C1-C30-alkyl;
(B) at least one methylene malonate polymer having formula (II):

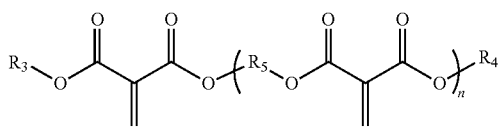

wherein, $R_3$ and $R_4$ are in each case independently selected from the group of C1-C30-alkyl;
n is integer from 2 to 8; and
$R_5$, if n=1 is, or if n>1 are in each case independently, selected from the group consisting of C1-C30-alkylene and C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 55 wt. %, and the acidic stabilizer (C) is in an amount of 0.1 to 120 ppm, in each case based on the total weight of the monomer (A) and the polymer (B).

The 9$^{th}$ embodiment is a composition comprising
(A) at least one methylene malonate monomer having formula (I):

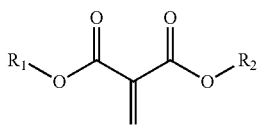

wherein, $R_1$ and $R_2$ are in each case independently selected from the group consisting of C1-C30-alkyl, C2-C30-alkenyl, C3-C30-cycloalkyl, C6-C30-aryl, halo-C1-C30-alkyl;
(B) at least one methylene malonate polymer having formula (II):

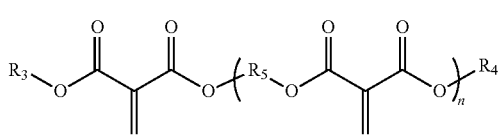

wherein, $R_3$ and $R_4$ are in each case independently selected from the group consisting of C1-C30-alkyl, C2-C30-alkenyl, C3-C30-cycloalkyl, C6-C30-aryl, halo-C1-C30-alkyl;
n is integer from 2 to 8; and
$R_5$, if n=1 is, or if n>1 are in each case independently, selected from the group consisting of C1-C30-alkylene, C2-C30-alkenylene, C2-C30-alkynylene, C6-C30-arylene, C3-C30-cycloalkylene, C3-C30-cycloalkenylene, C3-C30-cycloalkynylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 55 wt. %, and the acidic stabilizer (C) is in an amount of 0.1 to 120 ppm, in each case based on the total weight of the monomer (A) and the polymer (B).

The 10$^{th}$ embodiment is a composition comprising
(A) at least one methylene malonate monomer having formula (I):

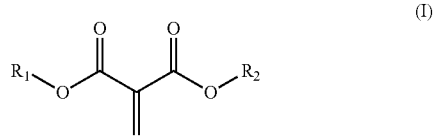

wherein, $R_1$ and $R_2$ are in each case independently selected from the group consisting of C1-C30-alkyl, C2-C30-alkenyl, C3-C30-cycloalkyl, C6-C30-aryl, halo-C1-C30-alkyl;
(B) at least one methylene malonate polymer having formula (II):

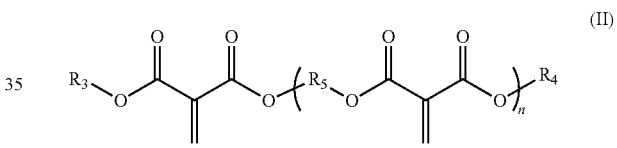

wherein, $R_3$ and $R_4$ are in each case independently selected from the group consisting of C1-C30-alkyl, C2-C30-alkenyl, C3-C30-cycloalkyl, C6-C30-aryl, halo-C1-C30-alkyl;
n is integer from 3 to 6; and
$R_5$, if n=1 is, or if n>1 are in each case independently, selected from the group consisting of C1-C30-alkylene and C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 55 wt. %, and the acidic stabilizer (C) is in an amount of 0.1 to 120 ppm, in each case based on the total weight of the monomer (A) and the polymer (B).

The 11$^{th}$ embodiment is a composition comprising
(A) at least one methylene malonate monomer having formula (I):

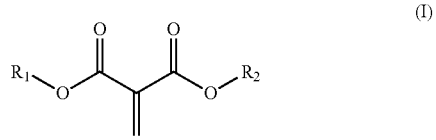

wherein, $R_1$ and $R_2$ are in each case independently selected from the group of C1-C30-alkyl;
(B) at least one methylene malonate polymer having formula (II):

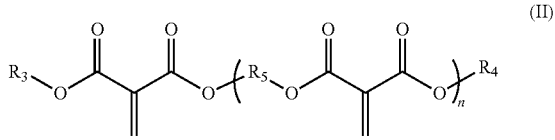

wherein, $R_3$ and $R_4$ are in each case independently selected from the group consisting of C1-C30-alkyl;
n is integer from 2 to 8; and
$R_5$, if n=1 is, or if n>1 are in each case independently, selected from the group of C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, monomer (A) is in an amount of 10 to 55 wt. %, and acidic stabilizer (C) is in an amount of 0.1 to 100 ppm, in each case based on the total weight of the monomer (A) and the polymer (B).

The 12th embodiment is a composition comprising
(A) at least one methylene malonate monomer having formula (I):

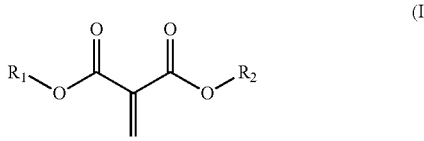

wherein, $R_1$ and $R_2$ are in each case independently selected from the group of C1-C30-alkyl;
(B) at least one methylene malonate polymer having formula (II):

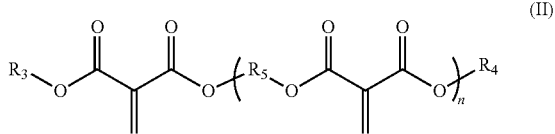

wherein, $R_3$ and $R_4$ are in each case independently selected from the group consisting of C1-C30-alkyl;
n is integer from 3 to 6; and
$R_5$, if n=1 is, or if n>1 are in each case independently, selected from the group of C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, monomer (A) is in an amount of 10 to 30 wt. %, and acidic stabilizer (C) is in an amount of 0.1 to 100 ppm, in each case based on the total weight of the monomer (A) and the polymer (B).

The 13th embodiment is a composition comprising
(A) at least one methylene malonate monomer having formula (I):

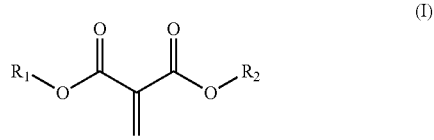

wherein, $R_1$ and $R_2$ are in each case independently selected from the group of C1-C30-alkyl;
(B) at least one methylene malonate polymer having formula (II):

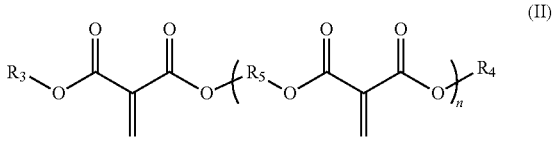

wherein, $R_3$ and $R_4$ are in each case independently selected from the group of C1-C30-alkyl;
n is integer from 3 to 6; and
$R_5$, if n=1 is, or if n>1 are in each case independently, selected from the group consisting of C1-C30-alkylene and C6-C30-arylene; and
(C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid,
wherein, the monomer (A) is in an amount of 10 to 30 wt. %, and the acidic stabilizer (C) is in an amount of 0.1 to 120 ppm, in each case based on the total weight of the monomer (A) and the polymer (B).

The 14th embodiment is a composition comprising
(A) at least one methylene malonate monomer having formula (I):

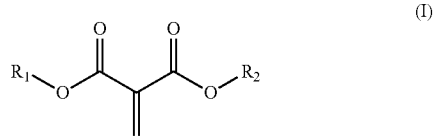

wherein, $R_1$ and $R_2$ are in each case independently selected from the group consisting of C1-C30-alkyl, C2-C30-alkenyl, C3-C30-cycloalkyl, C6-C30-aryl, halo-C1-C30-alkyl;
(B) at least one methylene malonate polymer having formula (II):

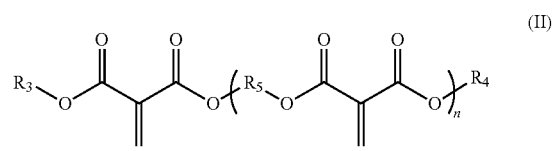

wherein, $R_3$ and $R_4$ are in each case independently selected from the group consisting of C1-C30-alkyl, C2-C30-alkenyl, C3-C30-cycloalkyl, C6-C30-aryl, halo-C1-C30-alkyl;

n is integer from 3 to 6; and $R_5$, if n=1 is, or if n>1 are in each case independently, selected from the group consisting of C1-C30-alkylene, C2-C30-alkenylene, C2-C30-alkynylene, C6-C30-arylene, C3-C30-cycloalkylene, C3-C30-cycloalkenylene, C3-C30-cycloalkynylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein, the monomer (A) is in an amount of 10 to 30 wt. %, and the acidic stabilizer (C) is in an amount of 0.1 to 120 ppm, in each case based on the total weight of the monomer (A) and the polymer (B).

The 15$^{th}$ embodiment is a composition comprising
(A) at least one methylene malonate monomer having formula (I):

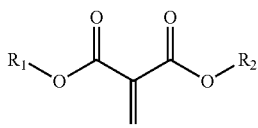

(I)

wherein, $R_1$ and $R_2$ are in each case independently selected from the group consisting of C1-C30-alkyl, C2-C30-alkenyl and C3-C30-cyclolalkyl;

(B) at least one methylene malonate polymer having formula (II):

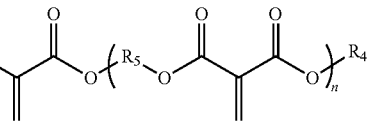

(II)

wherein, $R_3$ and $R_4$ are in each case independently selected from the group consisting of C1-C30-alkyl, C2-C30-alkenyl and C3-C30-cyclolalkyl;

n is integer from 3 to 6; and $R_5$, if n=1 is, or if n>1 are in each case independently, selected from the group consisting of C1-C30-alkylene and C6-C30-arylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein, the monomer (A) is in an amount of 10 to 30 wt. %, and the acidic stabilizer (C) is in an amount of 0.1 to 120 ppm, in each case based on the total weight of the monomer (A) and the polymer (B).

The 16$^{th}$ embodiment is a composition comprising
(A) at least one methylene malonate monomer having formula (I):

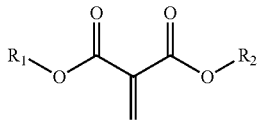

(I)

wherein, $R_1$ and $R_2$ are in each case independently selected from the group consisting of C1-C30-alkyl, C2-C30-alkenyl and C3-C30-cyclolalkyl;

(B) at least one methylene malonate polymer having formula (II):

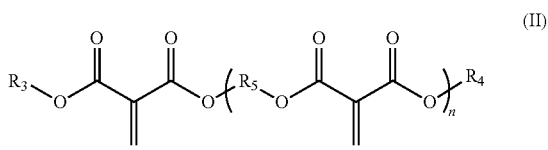

(II)

wherein, $R_3$ and $R_4$ are in each case independently selected from the group consisting of C1-C30-alkyl, C2-C30-alkenyl and C3-C30-cyclolalkyl;

n is integer from 3 to 6; and $R_5$, if n=1 is, or if n>1 are in each case independently, selected from the group consisting of C1-C30-alkylene, C2-C30-alkenylene, C2-C30-alkynylene, C6-C30-arylene, C3-C30-cycloalkylene, C3-C30-cycloalkenylene, C3-C30-cycloalkynylene; and (C) at least one selected from sulfuric acid ($H_2SO_4$), trifluoromethane sulfonic acid (TFA), chlorodifluoro acid, maleic acid, methane sulfonic acid (MSA), p-toluenesulfonic acid (p-TSA), difluoro acetic acid, trichloroacetic acid, phosphoric acid, dichloroacetic acid, wherein, the monomer (A) is in an amount of 10 to 30 wt. %, and the acidic stabilizer (C) is in an amount of 0.1 to 120 ppm, in each case based on the total weight of the monomer (A) and the polymer (B).

The 17$^{th}$ embodiment is a mixture comprising the composition according to any one of embodiments 1-16, which further comprises one or more additives selected from the group consisting of plasticizers, thixotropic agents, adhesion promoters, antioxidants, light stabilizers, UV stabilizer, filler, cement, lime stone, surfactant, wetting agents, viscosity modifier, dispersants, air release agents, anti-sagging agents, anti-setting agents, defoaming agent, coloring agent, fiber, polymer powder, mesh, chip, hollow spheres and inert resins.

The 18$^{th}$ embodiment is a mixture comprising the composition according to any one of embodiments 1-16, which further comprises one or more additives selected from the group consisting of plasticizers, thixotropic agents, surfactant, UV stabilizer, cement, lime stone and defoaming agent.

The 19$^{th}$ embodiment is a mixture comprising the composition according to any one of embodiments 1-16, which further comprises one or more additives selected from the group consisting of antioxidants, light stabilizers, UV stabilizers and fillers.

The 20$^{th}$ embodiment is a mixture comprising the composition according to any one of embodiments 1-16, which further comprises one or more additives selected from the group consisting of light stabilizers, pigments, air release agents and defoaming agent.

The 21$^{st}$ embodiment is a mixture comprising the composition according to any one of embodiments 1-16, which further comprises other additives selected from the group consisting of UV stabilizers pigments, air release agents and fillers.

The 22$^{nd}$ embodiment is a mixture comprising the composition according to any one of embodiments 1-16, which further comprises other additives selected from the group consisting of antioxidants, UV stabilizers, air release agents, defoaming agent and fillers.

EXAMPLE

The present invention will now be described with reference to Examples and Comparative Examples, which are not intended to limit the present invention.

The following starting materials were used:

Diethyl malonate (DEM) and Dihexyl malonate (DHM) were purchased from Alfa Aesar. Paraformaldehyde, potassium acetate, copper (II) acetate, Novazym 435 as a catalyst were purchased from Acros Organics. Trifluoromethane sulfonic acid, 1,5-pentanediol, 2-methylpropane-1,3-diol, 1,4-phenylenedimethanol were purchased from Alfa Aesar.

Analytical Methods (1) NMR (Nuclear Magnetic Resonance)

Routine one-dimensional NMR spectroscopy was performed on either a 400 MHz Varian® spectrometer or a 400 MHz Bruker® spectrometer. The samples were dissolved in deuterated solvents. Chemical shifts were recorded on the ppm scale and were referenced to the appropriate solvent signals, such as 2.49 ppm for DMSO-d6, 1.93 ppm for CD3CN, 3.30 ppm for CD3OD, 5.32 ppm for CD2Ol2 and 7.26 ppm for CDCl3 for 1H spectra.

(2) GC-MS (Gas Chromatography Mass Spectrometer)

GC-MS was obtained with a Hewlett Packard 5970 mass spectrometer equipped Hewlett Packard 5890 Gas Chromatograph with. The ion source was maintained at 270° C.

(3) EI-MS (Electron Impact Mass Spectrometer)

EI-MS was obtained using a thermos LTO-FT (Low Temperature Oxidation-Fourier Transform), a hybrid instrument consisting of a linear ion trap mass analyzer and Fourier transform ion cyclotron resonance mass analyzer.

Measurement Methods (1) Gel Time

Gel time means the time from the start of the composition until becoming the state of viscous, and it indicates the workability of the composition; particularly, long gel time (for example 20-30 min) is needed for roller coating, whereas short gel time (for example 0.5-5 min) is needed for spray coating.

(2) Dry Through Time

Dry through Time means the time from the start of mixing component I and component II to the solid state of the mixture.

(3) Adhesion

Adhesive bonding is measured according to ASTM D7234-12.

(4) Solvent Resistance

Solvent resistance is measured according to ASTM D1308-C2. The test period is ten days.

(5) Pull-Off Test

The pull-off test is to measure the adhesion between coating and concrete. The failure occurs at either coating-substrate or coating-glue interface or glue-dolly interfaces. Failure at the concrete phase indicates the adhesion between coating and concrete substrate is very high.

PREPARATION EXAMPLE

I. The Preparation of Monomer (A)

Example 1: The Preparation of Diethyl Methylenemalonate (DEMM)

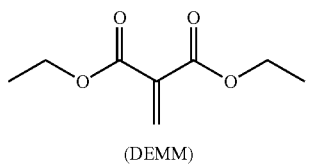

(DEMM)

<1>. In a two-liter 3-neck round bottom flask (equipped with a condenser), 60 g of paraformaldehyde (2 mol), 10 g of potassium acetate and 10 g of copper (II) acetate were mixed in 80 ml of tetrahydrofuran (THF).

<2>. This mixture was stirred and heated at 65° C. for 40 min. From an additional funnel, 160 g (1 mol) of diethyl malonate (DEM) was then added dropwise to the reaction mixture.

<3>. At the end of the addition of DEM (about an hour), the reaction mixture was further stirred at 65° C. for 2 hours.

<4>. The reaction mixture was then cooled to room temperature and 10 g of sulfuric acid was added into the flask with stirring.

<5>. The precipitates were then removed by filtration and the filtrate was collected. 0.01 g of sulfuric acid (60 ppm) was added to the collected filtrate.

<6>. The filtrate was then distilled at reduced pressure. Diethyl Methylenemalonate was collected at 55-70° C. with about 1.5 mm Hg of vacuum as the crude monomer.

<7>. The crude monomer (with 60 ppm of sulfuric acid) was further fractionally distilled with stainless steel packed column under reduced vacuum. This gives 141 g (yield of 82%, purity of 98%) pure monomer.

<8>. The monomer was stabilized with 40 ppm of sulfuric acid.

1H-NMR (400 MHz, CDCl3) δ 6.45 (s, 2H), 4.22 (q, 4H), 1.24 (t, 6H).

GC-MS (m/z): 173, 145, 127, 99, 55.

Example 2: The Preparation of Dihexyl Methylene Malonate (DHMM)

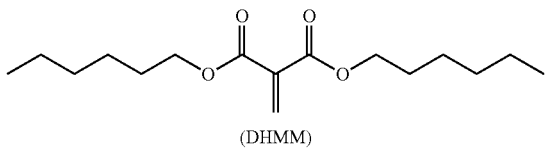

(DHMM)

The preparation is carried out according to Example 1, except for using dihexyl malonate in step 2. This gives 227 g (yield of 80%, purity of 95%) pure monomer. The monomer was stabilized with 60 ppm of sulfuric acid.

GC-MS (m/z): 284.

Example 3: The Preparation of Dicyclohexyl Methylene Malonate (DCHMM)

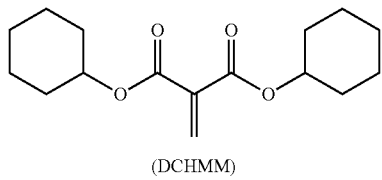

(DCHMM)

The preparation is carried out according to Example 1, except for using dicyclohexyl malonate in step 2. This gives 224 g (yield of 80%, purity of 95%) pure monomer. The monomer was stabilized with 60 ppm of sulfuric acid.

GC-MS (m/z): 280.

II. The Preparation of the Polymer (B)

Example 4: The Preparation of the Polymer (B-1)

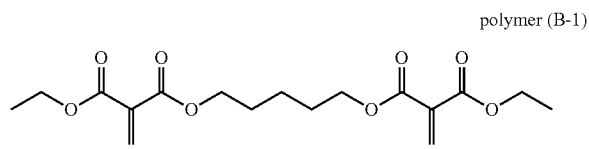 [SMILES: C=C(C(=O)OCC)C(=O)OCCCCCOC(=O)C(=C)C(=O)OCC]

polymer (B-1)

In a round flask (equipped with a condenser), 0.5 g Novazym 435 (catalyst), 17.3 g DEMM (0.1 mol) and 4.2 g 1,5-pentanediol (0.04 mol) were added. The mixture was stirred and heated at 65° C. for 6 hours, while the alcohol generated was removed through evaporation. The reaction mixture was then cooled to room temperature and stabilized with 10 ppm trifluoromethane sulfonic acid. The reaction mixture was filtered to remove the catalyst. The desired product was obtained.

ESI-MS (m/z): 357.

Example 5: The Preparation of the Polymer (B-2)

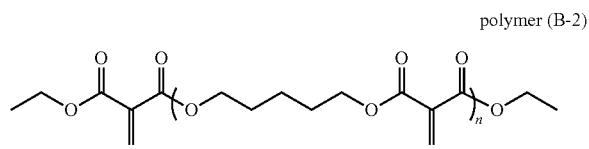

polymer (B-2)

In a round flask (equipped with a condenser), 0.5 g Novazym 435 (catalyst), 17.3 g DEMM (0.1 mol) and 8.3 g 1,5-pentanediol (0.08 mol) were added. The mixture was stirred and heated at 65° C. for 6 hours, while the alcohol generated was removed through evaporation. The reaction mixture was then cooled to room temperature and stabilized with 10 ppm trifluoromethane sulfonic acid. The reaction mixture was filtered to remove the catalyst. The desired product was obtained, wherein n is an integer from 2 to 8.

ESI-MS (m/z): 541 (n=2), 725 (n=3), 909 (n=4), 1093 (n=5), 1277 (n=6), 1461 (n=7), 1645 (n=8).

Example 6: The Preparation of the Polymer (B-3)

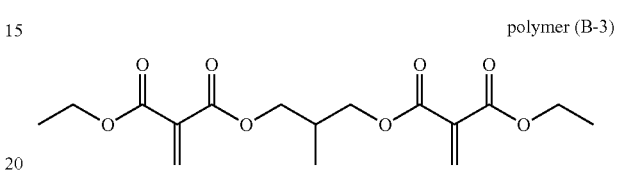

polymer (B-3)

In a round flask (equipped with a condenser), 0.5 g Novazym 435 (catalyst), 17.3 g DEMM (0.1 mol) and 3.6 g 2-methylpropane-1,3-diol (0.04 mol) were added. The mixture was stirred and heated at 65° C. for 6 hours, while the alcohol generated was removed through evaporation. The reaction mixture was then cooled to room temperature and stabilized with 10 ppm trifluoromethane sulfonic acid. The reaction mixture was filtered to remove the catalyst. The desired product was obtained.

ESI-MS (m/z): 343

Example 7: The Preparation of the Polymer (B-4)

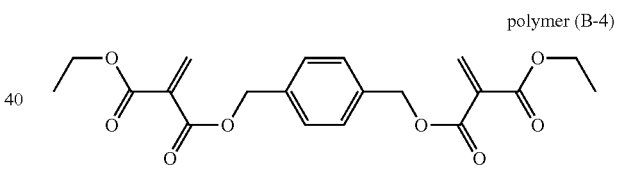

polymer (B-4)

In a round flask (equipped with a condenser), 0.5 g Novazym 435 (catalyst), 17.3 g DEMM (0.1 mol) and 5.52 g 1,4-phenylenedimethanol (0.04 mol) were added. The mixture was stirred and heated at 65° C. for 6 hours, while the alcohol generated was removed through evaporation. The reaction mixture was then cooled to room temperature and stabilized with 10 ppm trifluoromethane sulfonic acid. The reaction mixture was filtered to remove the catalyst. The desired product was obtained.

ESI-MS (m/z): 391

Example 8: The Preparation of the Polymer (B-5)

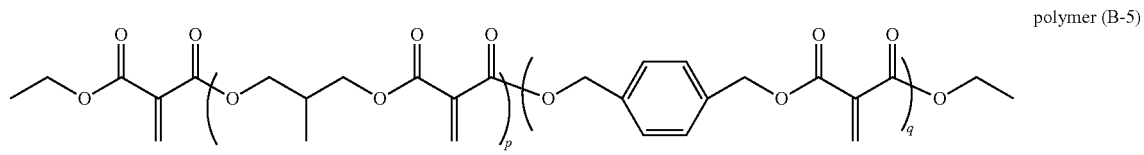

polymer (B-5)

In a round flask (equipped with a condenser), 0.5 g Novazym 435 (catalyst), 17.3 g DEMM (0.1 mol) 3.6 g 2-methylpropane-1,3-diol (0.04 mol) and 5.52 g 1,4-phenylenedimethanol (0.04 mol) were added. The mixture was stirred and heated at 65° C. for 6 hours, while the alcohol generated was removed through evaporation. The reaction mixture was then cooled to room temperature and stabilized with 10 ppm trifluoromethane sulfonic acid. The reaction mixture was filtered to remove the catalyst. The desired product was obtained, wherein the sum of p and q is an integer from 2 to 8.

ESI-MS (m/z): 561 (p=1, q=1), 779 (p=1, q=2), 731 (p=2, q=1), 949 (p=2, q=2), 997 (p=1, q=3), 901 (p=3, q=1), 1215 (p=1, q=4), 1167 (p=2, q=3), 1119 (p=3, q=2), 1071 (p=4, q=1), 1433 (p=1, q=5), 1385 (p=2, q=4), 1337 (p=3, q=3), 1289 (p=4, q=2), 1241 (p=5, q=1)

III. The Preparation of Composition

Example 9

The monomer (A) and polymer (B) as per table 1 were first placed in a polyethylene vessel with a magnetic stir bar. While stirring, without heating, at 900 rpm, the acidic stabilizer (C) was added into the vessel. The mixture is continuously stirred for an additional 5 minutes. This gives a ready-made composition.

TABLE 1

The components of the compositions

| Components | | Inventive composition | | | | | Comparative composition | |
|---|---|---|---|---|---|---|---|---|
| No. | | 1 | 2 | 3 | 4 | 5 | 6 | 7 |
| (A): Monomer | DEMM | — | — | — | 50 | — | 80 | 100 |
| (% by weight) | DHMM | — | 10 | 37 | 5 | 64 | 2 | — |
| (B) Polymer | Polymer (B-1) | 44 | 40 | 28 | 20 | 16 | 8 | — |
| (% by weight) | Polymer (B-2) | 56 | 50 | 35 | 25 | 20 | 10 | — |
| (C) acid stabilizer | MSA | 30 | 36 | 27 | 30 | 25.2 | 37 | 20 |
| (ppm) | H2SO4 | 10 | — | 9 | — | 8.4 | — | — |
| | TFA | — | 12 | — | 9 | — | 7 | 10 |

Test Example

Example 10: Test of Chemical Resistance and Mechanical Properties

Gel time, dry through time and hardness of the inventive compositions and the Comparative compositions were tested. The results are shown in the following Table 2-(a) and Table 2-(b).

TABLE 2-(a)

The results of gel time, drying time and hardness (substrate: dry concrete)

| Test (substrate: dry concrete) | Inventive composition | | | | | Comparative composition | | Epoxy/amine (100:22 by weight) |
|---|---|---|---|---|---|---|---|---|
| No. | 1 | 2 | 3 | 4 | 5 | 6 | 7 | |
| Gel Time at 25° C. (minutes) | 56 | 40 | 25 | 23 | 13 | 15 | 12 | 60 |
| Drying Time (minutes) | 150 | 90 | 53 | 50 | 36 | 40 | N.A.* | >48 hours |
| Appearance of surface | Dry and smooth | Dry and smooth | Dry and smooth | Dry and smooth | Dry and smooth | Dry but uneven | Not dry | Dry and Smooth |
| Hardness | No scratch | No scratch | No scratch | No scratch | No scratch | Easy to scratch | N.A.** | No scratch |

*The sample is always tacky and fails to be measured.
**The sample fails to be measured.

TABLE 2-(b)

The results of gel time, drying time and hardness (substrate: wet concrete)

| Test (substrate: wet concrete) | Inventive composition | Comparative composition |
|---|---|---|
| No. | 4 | 7 |
| Gel Time at 25° C. (minutes) | 50 | 5 |
| Drying Time | 70 minutes | N.A.* |
| Appearance of surface | Dry and Smooth | Not dry |
| Hardness | No scratch | N.A.** |

*The sample is always tacky and fails to be measured.
**The sample fails to be measured.

It shows that inventive compositions 1 and 2 have excellent workability and controlled curing compared to the comparative compositions and epoxy/amine system.

Example 11

Adhesive bonding of the inventive compositions and the Comparative compositions was tested. The results are shown in the following Table 3.

TABLE 3

The adhesive bonding of the samples with concrete

| Test (substrate: concrete) | Inventive composition | | | | | Comparative composition | | Epoxy/amine |
|---|---|---|---|---|---|---|---|---|
| No. | 1 | 2 | 3 | 4 | 5 | 6 | 7 | (100:22 by weight) |
| Failure phase | concrete | concrete | concrete | concrete | concrete | concrete | concrete | Interface of concrete and epoxy resin |

It shows that the composition of Example 1 and Example 2 have good adhesive bonding with concrete.

Example 12

Solvent resistance of the inventive compositions and the Comparative compositions was tested. The results are shown in the following Table 4.

TABLE 4

The solvent resistance of the samples

| Test (solvent resistance) | Inventive composition | | | | | Comparative composition | |
|---|---|---|---|---|---|---|---|
| No. | 1 | 2 | 3 | 4 | 5 | 6 | 7 |
| $H_3PO_4$ (25 wt %) | Resistant | Resistant | Resistant | Resistant | Resistant | Not resistant | Not resistant |
| Citric acid (20 wt %) | Resistant | Resistant | Resistant | Resistant | Resistant | Not resistant | Not resistant |
| NaOH (10 wt %) | Resistant | Resistant | Resistant | Resistant | Resistant | Resistant | Resistant |
| $H_2O_2$ | Resistant | Resistant | Resistant | Resistant | Resistant | Not resistant | Not resistant |

It shows that the composition of Example 1 and Example 2 both have good resistance against common solvents. The structures, materials, compositions, and methods described herein are intended to be representative examples of the invention, and it will be understood that the scope of the invention is not limited by the scope of the examples. Those skilled in the art will recognize that the invention is practiced with variations on the disclosed structures, materials, compositions, and methods, and such variations are regarded as within the ambit of the invention. Thus, it is intended that the present invention cover such modifications and variations as come within the scope of the appended claims and their equivalents.

The invention claimed is:

1. A composition comprising (A) at least one methylene malonate monomer having formula (I)

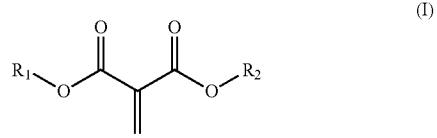

wherein, $R_1$ and $R_2$ are independently selected from the group consisting of C1-C30-alkyl, C2-C30-alkenyl, C3-C30-cyclolalkyl, C2-C30-heterocyclyl, C2-C30-heterocyclyl-C1-C30-alkyl, C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cycloalkyl, each of which radicals is optionally substituted, the heteroatom being selected from N, O and S;

(B) at least one methylene malonate compound having formula (II):

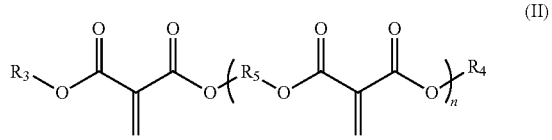

wherein, R₃ and R₄ are independently selected from the group consisting of C1-C30-alkyl, C2-C30-alkenyl, C3-C30-cyclolalkyl, C2-C30-heterocyclyl, C6-C30-heterocyclyl-C1-C30-alkyl, C6-C30-aryl, C6-C30-aryl-C1-C30-alkyl, C2-C30-heteroaryl, C2-C30-heteroaryl-C1-C30-alkyl, C1-C30-alkoxy-C1-C30-alkyl, halo-C1-C30-alkyl, and halo-C3-C30-cyclolalkyl, each of which radicals is optionally substituted, the heteroatom being selected from N, O and S;

n is an integer from 1 to 20;

R₅, if n=1 is, or if n>1 are independently, selected from the group consisting of C1-C30-alkylene, C2-C30-alkenylene, C2-C30-alkynylene, C6-C30-arylene, C3-C30-cyclolalkylene, C3-C30-cyclolalkenylene, C3-C30-cyclolalkynylene, C2-C30-heterocyclylene, and C2-C30-heteroarylene, each of which radicals is optionally substituted, the heteroatom being selected from N, O and S, wherein R₅ is optionally interrupted by a radical selected from N, O and S; and (C) two or more acidic stabilizers selected from the group consisting of methane sulfonic acid, sulfuric acid, tri-fluoromethane sulfonic acid, tri-chloroacetic acid, and dichloroacetic acid;

wherein, the monomer (A) is in an amount of 37 to 75 wt. % and the component (C) is in an amount of from 0.1 to 1000 ppm in each case based on the total weight of the monomer (A) and the compound (B).

2. The composition according to claim 1, wherein R₁ and R₂ are independently selected from the group consisting of C1-C10-alkyl, C2-C10-alkenyl, C3-C10-cyclolalkyl, C2-C10-heterocyclyl, C2-C10-heterocyclyl-C1-C10-alkyl, C3-C18-aryl, C3-C18-aryl-C1-C10-alkyl, C2-C10-heteroaryl, C2-C10-heteroaryl-C1-C10-alkyl, and C1-C10-alkoxy-C1-C10-alkyl, halo-C1-C10-alkyl, and halo-C3-C10-cyclolalkyl; each of which radicals is optionally substituted by at least one radical selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-heterocyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, the heteroatom being selected from N, 0 and S;

R₃ and R₄ are independently selected from the group consisting of C1-C10-alkyl, C2-C10-alkenyl, C3-C10-cyclolalkyl, C2-C10-heterocyclyl, C2-C10-heterocyclyl-C1-C10-alkyl, C3-C18-aryl, C3-C18-aryl-C1-C10-alkyl, C2-C10-heteroaryl, C2-C10-heteroaryl-C1-C10-alkyl, and C1-C10-alkoxy-C1-C10-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-heterocyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10-heteroaryl, C3-C10-cyclolalkenyl, and C3-C10-cyclolalkynyl, the heteroatom being selected from N, O and S;

n is an integer from 1 to 15;

R₅, if n=1 is, or if n>1 are independently, selected from the group consisting of C1-C10-alkylene, C2-C10-alkenylene, C2-C10-alkynylene, C3-C18-arylene, C3-C10-cyclolalkylene, C3-C10-cyclolalkenylene, C3-C10-cyclolalkynylene, C2-C10-heterocyclylene, and C2-C10-heteroarylene, each of which radicals is optionally substituted by at least one radical selected from the group consisting of halogen, hydroxyl, nitro, cyano, C1-C10-alkyl, C2-C10-alkenyl, C2-C10-alkynyl, C1-C10-alkoxy, C3-C10-cyclolalkyl, C2-C10-heterocyclyl, C2-C10-heterocyclyl-C1-C10-alkyl, halo-C1-C10-alkyl, halo-C3-C10-cyclolalkyl, C3-C18-aryl, C3-C18-aryl-C1-C10-alkyl, C2-C10 heteroaryl, C3-C10-cyclolalkenyl, and C3-C10-cyclolalkynyl, the heteroatom being selected from N, O and S, wherein R₅ is optionally interrupted by a radical selected from N, O and S.

3. The composition according to claim 1, wherein R₁ and R₂ are independently selected from the group consisting of C1-C6-alkyl, C2-C6-alkenyl, C3-C6-cyclolalkyl, C3-C6-heterocyclyl, C3-C6-heterocyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-heterocyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S;

R₃ and R₄ are independently selected from the group consisting of C1-C6-alkyl, C2-C6-alkenyl, C3-C6-cyclolalkyl, C3-C6-heterocyclyl, C3-C6-heterocyclyl-C1-C6-alkyl, C6-C8-aryl, C6-C8-aryl-C1-C6-alkyl, C3-C6-heteroaryl, C3-C6-heteroaryl-C1-C6-alkyl, C1-C6-alkoxy-C1-C6-alkyl, halo-C1-C10-alkyl, and halo-C3-C10-cyclolalkyl, each of which radicals is optionally substituted by at least one radical selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-heterocyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S;

n is an integer from 1 to 10;

R₅, if n=1 is, or if n>1 are independently, selected from the group consisting of C1-C6-alkylene, C2-C6-alkenylene, C2-C6-alkynylene, C6-C8-arylene, C3-C6-cyclolalkylene, C3-C6-cyclolalkenylene, C3-C10-cyclolalkynylene, C3-C6-heterocyclylene, and C3-C6-heteroarylene, each of which radicals is optionally substituted by at least one radical selected from the group consisting of halogen, hydroxyl, nitro, cyano, C1-C6-alkyl, C2-C6-alkenyl, C2-C6-alkynyl, C1-C6-alkoxy, C3-C6-cyclolalkyl, C3-C6-heterocyclyl, C3-C6-heterocyclyl-C1-C6-alkyl, halo-C1-C6-alkyl, halo-C3-C6-cyclolalkyl, C6-C8-aryl, C6-C8-aryl-C1-C6-alkyl, C3-C6-heteroaryl, C3-C6-cyclolalkenyl, and C3-C6-cyclolalkynyl, the heteroatom being selected from N, O and S, wherein R₅ is optionally interrupted by a radical selected from N, O and S.

4. The composition according to claim 1, wherein R₁ and R₂ are independently selected from the group consisting of C1-C6-alkyl;

R₃ and R₄ are independently selected from the group consisting of C1-C6-alkyl;

n is an integer from 1 to 8; and

R₅, if n=1 is, or if n>1 are independently, selected from the group consisting of C1-C6-alkylene and C6-C8-arylene, each of which radicals is optionally substituted by at least one C1-C6-alkyl.

5. A process for preparing the composition according to claim 1, comprising steps of mixing the monomer (A), the compound (B) and the acidic stabilizers (C).

6. A coating material comprising the composition according to claim 1.

7. The coating material according to claim 6, wherein the composition is used in a construction application.

8. The coating material according to claim 7, wherein the construction application is selected from the group consisting of flooring, waterproofing, wall paint and underground construction applications.

9. The coating material according to claim 6, wherein the composition is applied on an alkali substrate.

10. The coating material of the composition according to claim 9, wherein the alkali substrate is one or more selected from the group consisting of concrete, alkali stone, alkali mineral powder and metals.

11. The coating material of the composition according to claim 6, wherein the composition is applied on wet substrates.

12. The coating material of the composition according to claim 7, wherein the temperature for the use is from −30° C. to 60° C.

13. The coating material of the composition according to claim 7, wherein the temperature for the use is from −20° C. to 40° C.

14. The coating material of the composition according to claim 7, wherein the relative humidity for the use is from 1% to 99%.

15. The coating material of the composition according to claim 7, wherein the relative humidity for the use is from 5% to 95%.

* * * * *